Patented May 7, 1935

2,000,160

UNITED STATES PATENT OFFICE 2,000,160

COMPOSITION OF MATTER AND PROCESS OF PRODUCING POROUS MATERIAL

William Edward Broeg, Chicago, Ill., assignor to Standard Brands Incorporated, New York, N. Y., a corporation of Delaware No Drawing. Application August 10, 1928, Serial No. 298,872. Renewed September 20, 1934

9 Claims. (Cl. 99—10)

This invention relates to a composition of matter adapted to produce a spongy or porous product. The invention also covers the application of this product. In one specific form the product is known as baking powder and utilized to cause the raising of dough in the manufacture of food products such as cake, bread and others.

It is an object of this invention to produce a greater degree of expansion in the dough than is, at present, possible with commercial types of baking powder. Another object of this invention is to produce a more porous resultant product or one occupying a greater volume for a given weight. A further object of this invention is to permit the manufacture of a given size loaf with a smaller amount of flour and other ingredients. An additional object of this invention is to reduce the quantity of carbon dioxide necessary for the formation of a proper loaf by retarding the escape of the carbon dioxide.

It will be apparent, therefore, that my invention serves to produce a larger loaf with a given quantity of material and to use less carbon dioxide and, therefore, less of the chemicals required to produce carbon dioxide. This results in a less expensive loaf and a more satisfactory loaf, since one measure of the quality of cake and similar products is the so-called lightness and porosity. My invention therefore results in marked economy, improved quality and other features which will be evident from the specifications and claims.

It is well known that commercial baking powders consist normally of a mixture of sodium bicarbonate known as baking soda with an acid reagent capable of liberating carbon dioxide from the baking soda under the proper conditions. While sodium bicarbonate is a constituent of nearly all present-day baking powders the acid reagent is often varied including such materials as the following:

Potassium bitartrate (cream of tartar), tartaric acid, monosodium phosphate, monocalcium phosphate, sodium aluminum sulphate, sodium pyrophosphate.

In addition to the above materials most commercial formulas for the preparation of baking powder include a certain amount of starch, such as corn starch, which serves to dilute the reagents; to prevent the reaction taking place until water is added and to reduce the hazards of premature action due to presence of moisture. The addition of starch also undoubtedly assists in the distribution of the chemical reagents throughout the dough.

It will be noted that the above materials have no particular plasticity, even in the condition existing in the dough and in themselves serve merely to produce bubbles of carbon dioxide in the presence of moisture and heat. In utilizing any of the above mixtures the viscosity of the dough is relied upon to retain the bubbles of carbon dioxide as they are produced. As a result of this condition, a considerable quantity of the carbon dioxide generated is invariably lost due to the escape of small bubbles from the mixture. The natural result of this loss is the necessity of adding larger amounts of the baking powder than would normally be required and also the production of a dough which is not as porous or spongy as might be desired.

I have found that this condition may be materially improved by adding to the carbon dioxide producing agents a third material which when mixed with water becomes highly viscous and plastic serving to retain the small bubbles of carbon dioxide with the results set forth.

I prefer to use as this material a substance known as gum karaya, Indian gum, dextrine or similar material. This substance on the addition of water with varying degrees of heat forms a highly viscous sticky mass which traps the bubbles of carbon dioxide and holds them in the dough. I may use varying amounts of the viscous material but in general find that it is desirable to add, at least ten per cent and preferably from twenty to twenty-five per cent, by weight of the gum. In some cases I may add up to fifty per cent of the gum and still obtain excellent results. Obviously the nature of the carbon dioxide producing agents and the desired character of the resultant powder will largely influence the formula employed. I may add the viscous material with the corn starch which is, at present, commonly employed in baking powders or I may eliminate the corn starch entirely and substitute therefor the various gums or dextrines which I have disclosed.

As an example of typical formulas which I have tried and find highly satisfactory, the following may be cited:

| Ingredient | Parts by weight |
| --- | --- |
| Sodium bicarbonate | 26.73 |
| Tartaric acid | 5.97 |
| Potassium bitartrate | 44.90 |
| Gum karaya | 22.40 |

It should be understood where I refer to gum karaya in this and other formulas that I may use other equivalent materials such as various dextrines, gums, agar agar, gelatins, (either vegetable or animal), gum tragacanth, gum arabic, etc. I may use the various gums or other equivalents, separately or mixed in varying portions. It is to be understood that the term "a gum" as used in the claims includes gum karaya and the equivalent materials hereinbefore mentioned.

Another formula which I have found satisfactory consists of the following:

| Ingredient | Parts by weight |
|---|---|
| Sodium bicarbonate | 26.73 |
| Monosodium phosphate | 38.20 |
| Gum karaya | 35.07 |

A typical formula which I have found very satisfactory using monocalcium phosphate consists of the following:

| Ingredient | Parts by weight |
|---|---|
| Sodium bicarbonate | 26.73 |
| Mono calcium phosphate | 33.43 |
| Gum karaya | 39.84 |

A satisfactory formula using sodium aluminum sulphate consists of:

| Ingredient | Parts by weight |
|---|---|
| Sodium bicarbonate | 26.73 |
| Sodium aluminum sulphate | 25.68 |
| Gum karaya | 47.59 |

A satisfactory formula using monosodium phosphate consists of:

| Ingredient | Parts by weight |
|---|---|
| Sodium bicarbonate | 25.00 |
| Monosodium phosphate | 50.00 |
| Gum karaya | 25.00 |

A satisfactory formula using cream of tartar consists of:

| Ingredient | Parts by weight |
|---|---|
| Sodium bicarbonate | 25.00 |
| Cream of tartar | 50.00 |
| Gum karaya | 25.00 |

A formula using sodium pyrophosphate to good advantage consists of the following:

| Ingredients | Parts by weight |
|---|---|
| Sodium bicarbonate | 37.50 |
| Monocalcium phosphate | 37.50 |
| Sodium pyrophosphate | 12.50 |
| Gum karaya | 12.50 |

Two typical formulæ using sodium aluminum sulphate and monocalcium phosphate follow:

| Ingredients | Parts by weight |
|---|---|
| Sodium bicarbonate | 26.73 |
| Monocalcium phosphate | 4.62 |
| Sodium aluminum sulphate | 25.68 |
| Gum karaya | 42.97 |

| Ingredients | Parts by weight |
|---|---|
| Sodium bicarbonate | 26.73 |
| Monocalcium phosphate | 13.28 |
| Sodium aluminum sulphate | 19.92 |
| Gum karaya | 40.07 |

It should be understood that in all of the above formulas I may substitute for some of the gums specified, corn starch in order to obtain a greater dilution. I may also use a substance capable of emitting a nitrogen compound on heating, as urea, urethane, ethyl urethane, etc., either alone or in combination with urease or urase, whereby ammonia or ammonia and carbon dioxide are formed, in admixture with the gum material previously specified. The release of ammonia and carbon dioxide would result in the formation of ammonia carbonate at low temperature, which upon heating would be split up yielding ammonia and carbon dioxide. I have also found that the addition of gum karaya or other gas retaining gum materials gives excellent results when used in combination with mucic acid and sodium bicarbonate or a combination of mucic acid mixed with pyrophosphate, tartaric acid or the related acid producing materials. Under certain conditions I have found that powdered lactic acid, acetic acid or citric acid mixed with sodium bicarbonate and the various gum materials makes an excellent baking powder for certain conditions.

I do not claim as my invention the combination of sodium bicarbonate and acid type of material and starch, as this combination is old and well known in the art. My invention consists, however, in the addition of a viscous or gummy material.

In the claims I have used the term "substance capable of emitting a nitrogen compound on heating" to designate as a class the nitrogen containing compounds having this property, as urea, urethane, ethyl urethane etc., which compounds may be used either alone or in combination with urease or urase and I consider the use of such compounds and/or combinations thereof as a part of my invention.

Having now fully described my invention what I claim as new and wish to secure by Letters Patent in the United States, is as follows:

1. A yeast free composition of matter containing gum karaya and urea for the purpose of leavening baking powder products.

2. A yeast free composition of matter containing a gum urethane and a starch.

3. As a composition of matter a leavening agent containing a gum, in combination with a substance capable of emitting a gas containing a nitrogen compound on heating and belonging to the group consisting of urea, urethane and ethyl urethane.

4. A yeast free composition of matter adapted for the leavening of baking powder products containing as ingredients a gum, a substance capable of emitting a gas containing a nitrogen compound on heating and belonging to the group consisting of urea, urethane and ethyl urethane, and urease.

5. As a composition of matter a leavening agent containing as ingredients gum karaya, urea and urease.

6. As a composition of matter a leavening agent containing as ingredients gum karaya, urea, urease and a starch.

7. As a composition of matter, a leavening agent containing as ingredients a gum, urea, and urease.

8. As a composition of matter, a leavening agent containing as ingredients a gum, urea, urease, and a starch.

9. A yeast free composition of matter containing a gum and urea for the purpose of leavening baking powder products.

WILLIAM EDWARD BROEG.